US012619960B2

(12) United States Patent
Sun et al.

(10) Patent No.: US 12,619,960 B2
(45) Date of Patent: May 5, 2026

(54) OPTIMIZING LEDGER USAGE AND LIQUIDATION OPERATIONS THEREON

(71) Applicant: Ripple Labs Inc., San Francisco, CA (US)

(72) Inventors: Chuan Sun, San Francisco, CA (US); Hope Chapman, San Francisco, CA (US); Piali Das, San Francisco, CA (US); Jon Wedrogowski, San Francisco, CA (US); Laurel Ruhlen, San Francisco, CA (US); Bradley Chase, San Francisco, CA (US)

(73) Assignee: Ripple Labs Inc., San Francisco, CA (US)

( * ) Notice: Subject to any disclaimer, the term of this patent is extended or adjusted under 35 U.S.C. 154(b) by 0 days.

(21) Appl. No.: 18/480,468

(22) Filed: Oct. 3, 2023

(65) Prior Publication Data

US 2024/0112156 A1    Apr. 4, 2024

Related U.S. Application Data

(60) Provisional application No. 63/412,809, filed on Oct. 3, 2022.

(51) Int. Cl.
*G06Q 20/06* (2012.01)
*G06Q 20/02* (2012.01)
(Continued)

(52) U.S. Cl.
CPC ......... *G06Q 20/0652* (2013.01); *G06Q 20/02* (2013.01); *G06Q 20/065* (2013.01);
(Continued)

(58) Field of Classification Search
CPC .. G06Q 20/0652; G06Q 20/02; G06Q 20/065; G06Q 20/367; G06Q 40/04; G06Q 20/36; G06Q 20/3676; H04L 9/50
(Continued)

(56) References Cited

U.S. PATENT DOCUMENTS 8,181,071 B2    5/2012   Cahill et al.
8,626,653 B1    1/2014   Krikorian et al.
(Continued)

FOREIGN PATENT DOCUMENTS

CN        108615193 A     10/2018
JP        2018124640 A     8/2018
(Continued)

OTHER PUBLICATIONS

Tiwari et al., Wiser: Increasing Throughput in Payment Channel Networks with Transaction Aggregation, May 23, 2022, https://arxiv.org/abs/2205.11597v1. (Year: 2022).*
(Continued)

*Primary Examiner* — Bennett M Sigmond
*Assistant Examiner* — George N. Proios
(74) *Attorney, Agent, or Firm* — Mahamedi IP Law LLP

(57) ABSTRACT

A network-based computing system can implement a transaction service in which digital wallets of client transaction entities are dynamically monitored to maintain a balance within a liquidity tranche unique to each transaction entity. The computing system can further execute a smart liquidity model that parses transaction requests into smaller clips and execution timing intervals such that risk of transaction failure is minimized or eliminated.

16 Claims, 5 Drawing Sheets

(51) Int. Cl.
*G06Q 20/36* (2012.01)
*G06Q 40/04* (2012.01)

(52) U.S. Cl.
CPC ........... *G06Q 20/367* (2013.01); *G06Q 40/04* (2013.01); *G06Q 40/0421* (2025.08); *G06Q 40/044* (2025.08); *G06Q 40/046* (2025.08)

(58) Field of Classification Search
USPC ........................................................ 705/39
See application file for complete search history.

(56) References Cited

U.S. PATENT DOCUMENTS

| | | | |
|---|---|---|---|
| 10,269,009 B1* | 4/2019 | Winklevoss et al. | |
| 10,354,325 B1 | 7/2019 | Skala et al. | |
| 10,776,781 B2 | 9/2020 | Mayblum et al. | |
| 10,937,096 B2* | 3/2021 | Qiu | |
| 11,017,381 B1 | 5/2021 | Winklevoss et al. | |
| 11,430,066 B2 | 8/2022 | Doney | |
| 12,020,239 B2 | 6/2024 | Treitlinger et al. | |
| 2002/0087454 A1 | 7/2002 | Calo et al. | |
| 2002/0143614 A1 | 10/2002 | MacLean et al. | |
| 2002/0156718 A1 | 10/2002 | Olsen et al. | |
| 2004/0068461 A1 | 4/2004 | Schluetter | |
| 2004/0167854 A1 | 8/2004 | Knowles et al. | |
| 2005/0154674 A1 | 7/2005 | Nicholls et al. | |
| 2006/0173693 A1 | 8/2006 | Arazi et al. | |
| 2007/0045395 A1 | 3/2007 | Corona et al. | |
| 2009/0248574 A1* | 10/2009 | Leung et al. | G06Q 40/00 705/39 |
| 2010/0280936 A1 | 11/2010 | Trickey et al. | |
| 2013/0031002 A1 | 1/2013 | Hibbard | |
| 2014/0156512 A1 | 6/2014 | Rahman et al. | |
| 2015/0363769 A1* | 12/2015 | Ronca et al. | |
| 2017/0116608 A1* | 4/2017 | Forzley et al. | |
| 2017/0228704 A1 | 8/2017 | Zhou et al. | |
| 2017/0270527 A1 | 9/2017 | Rampton | |
| 2019/0095992 A1* | 3/2019 | Soh | |
| 2019/0303892 A1* | 10/2019 | Yantis et al. | |
| 2020/0111086 A1 | 4/2020 | Castinado et al. | |
| 2021/0019827 A1* | 1/2021 | Kim et al. | |
| 2021/0056627 A1* | 2/2021 | Lee | |
| 2021/0192501 A1 | 6/2021 | McNamara et al. | |
| 2021/0209684 A1 | 7/2021 | Foote et al. | |
| 2021/0357917 A1 | 11/2021 | Dalton | |
| 2022/0156837 A1 | 5/2022 | Malik et al. | |
| 2023/0011788 A1 | 1/2023 | Wong et al. | |
| 2023/0298034 A1 | 9/2023 | Nonni | |
| 2023/0376940 A1 | 11/2023 | Duris et al. | |
| 2024/0112157 A1 | 4/2024 | Sun et al. | |
| 2024/0311806 A1 | 9/2024 | Treitlinger et al. | |

FOREIGN PATENT DOCUMENTS

| | | |
|---|---|---|
| KR | 1020190091211 A | 8/2019 |
| WO | 2019073842 A1 | 4/2019 |
| WO | 2019147069 A1 | 8/2019 |

OTHER PUBLICATIONS

Alvarez et al, "Fault Tolerance in Highly Reliable Ethernet-Based Industrial Systems", IEEE, vol. 7, No. 6, Jun. 2019, pp. 977-1010.
Intellectual Property Office of Singapore, SG Application No. 11202250406B, Search Report dated Mar. 8, 2024, 2 pages.
International Search Report and Written Opinion dated May 6, 2021, PCT Application No. PCT/US2020/064924, 16 pages.
Intellectual Property Office of Singapore, International Search Report and Written Opinion dated May 6, 2021, PCT Application No. PCT/US2020/064924, 16 pages.
Intellectual Property Office of Singapore, Search Report dated Mar. 8, 2024, SG Application No. 11202250406B, 2 pages.

* cited by examiner

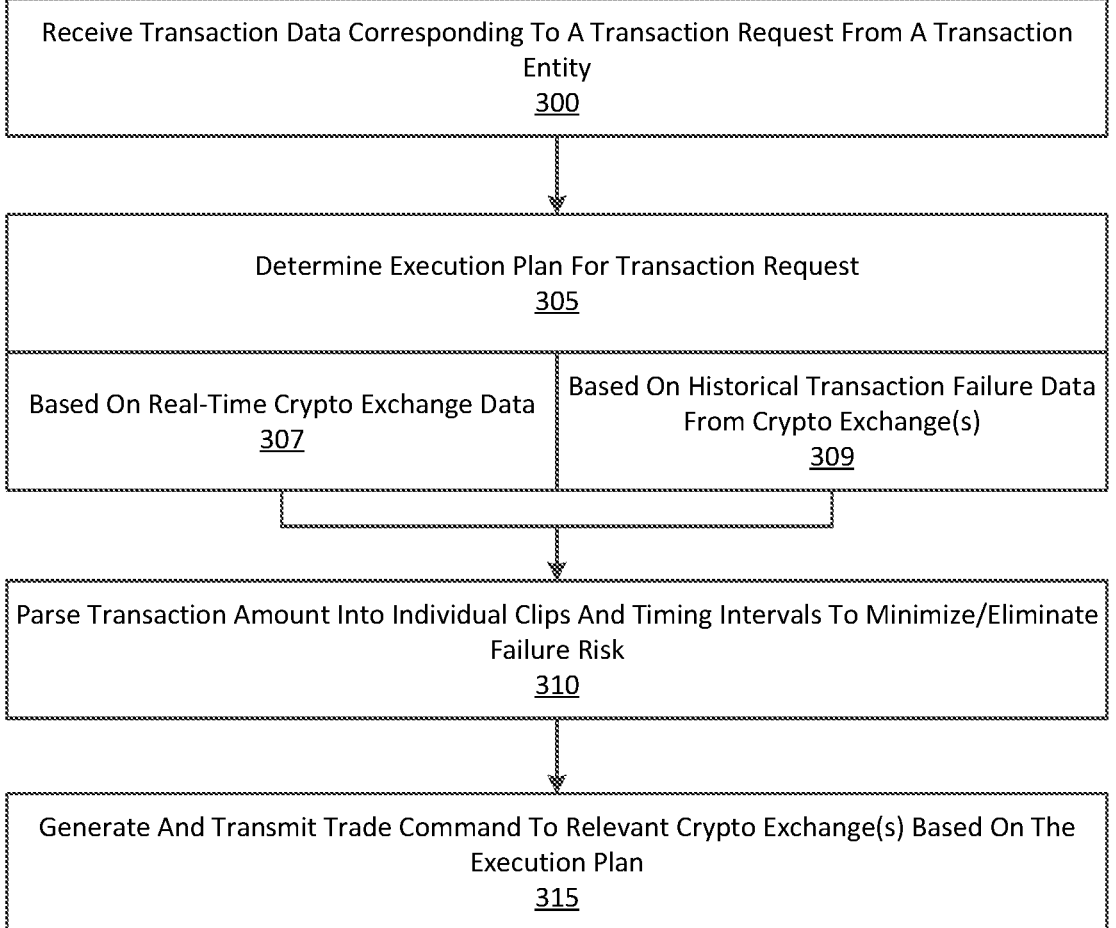

Receive Transaction Data Corresponding To A Transaction Request From A Transaction Entity
300

Determine Execution Plan For Transaction Request
305

Based On Real-Time Crypto Exchange Data
307

Based On Historical Transaction Failure Data From Crypto Exchange(s)
309

Parse Transaction Amount Into Individual Clips And Timing Intervals To Minimize/Eliminate Failure Risk
310

Generate And Transmit Trade Command To Relevant Crypto Exchange(s) Based On The Execution Plan
315

FIG. 3

OPTIMIZING LEDGER USAGE AND LIQUIDATION OPERATIONS THEREON

RELATED APPLICATION(S)

This application claims benefit of priority to provisional U.S. Patent Application No. 63/412,809, filed Oct. 3, 2022; the aforementioned priority application being hereby incorporated by reference in its entirety.

TECHNOLOGICAL FIELD

This application relates to ledgers, including block-chains and distributed ledgers, and more specifically, to optimizing ledger usage and liquidation operations that utilize ledgers.

BACKGROUND

Transaction entities may require cross-border payments and transactions involving foreign exchange and other asset conversions. Digital currencies or assets can facilitate instant, immutable conversions at crypto exchanges using distributed ledgers.

Ledger-based exchanges (e.g., crypto-exchanges) utilize block chain ledgers to process transactions. Transactions on such exchanges typically move funds in the form of a fiat to a digital asset, a digital asset to a fiat, and/or a first digital asset to a second digital asset. Digital assets are typically in the form of data structures that are associated with accounts and values, and their existence is cryptographically secured on the block chain. When a transaction is executed, an immutable record of the transaction is stored on the block chain. In general, the block chain ledger stores, in immutable form, account identifiers, account balances (including digital assets and/or available fiat), and transfers, with each transfer being subject to validation processes of the ledger.

Ledger-based exchanges face technical challenges that are not present with other types of exchanges and markets. Among them, the transaction count or volume can negatively affect the technological efficiency or throughput of the exchange, as each transaction requires its own set of computational resources to record and validate the transaction. Typically, when the amount of activity increases on a ledger-based exchange, the efficiency of the ledger-based exchange decreases, meaning transactions can take longer to execute simply because of availability and use computing/networking resources. These technological inefficiencies are distinct from market inefficiencies, such as market volatility due to changes in supply/demand. Technological inefficiencies directly relate to the ability of a ledger-based exchange to execute computing processes for a transaction, separate from, for example, market delays and conditions. Technological efficiencies in general, can relate to the availability of technological resources, including computing resources (e.g., amount and type of processing resources, location of processing resources, etc.), networking resources (e.g., available bandwidth), and availability of memory resources, including memory resources where a blockchain (or portion thereof) of the transaction is stored.

As such, under conventional approaches, in periods of high transaction volume, the technological efficiency and throughput of a ledger-based exchange can drop, resulting in slower execution time for transactions. Conversely, in periods of low transaction volume, the abundance of computing resources can represent unwanted expenditure of resources, representing cost and/or an increased carbon footprint.

BRIEF DESCRIPTION OF THE DRAWINGS

The disclosure herein is illustrated by way of example, and not by way of limitation, in the figures of the accompanying drawings in which like reference numerals refer to similar elements, and in which:

FIG. 3 is a flow chart describing an example of executing a liquidation model for minimizing liquidation failure risk, according to examples described herein;

DETAILED DESCRIPTION

Figure 1:
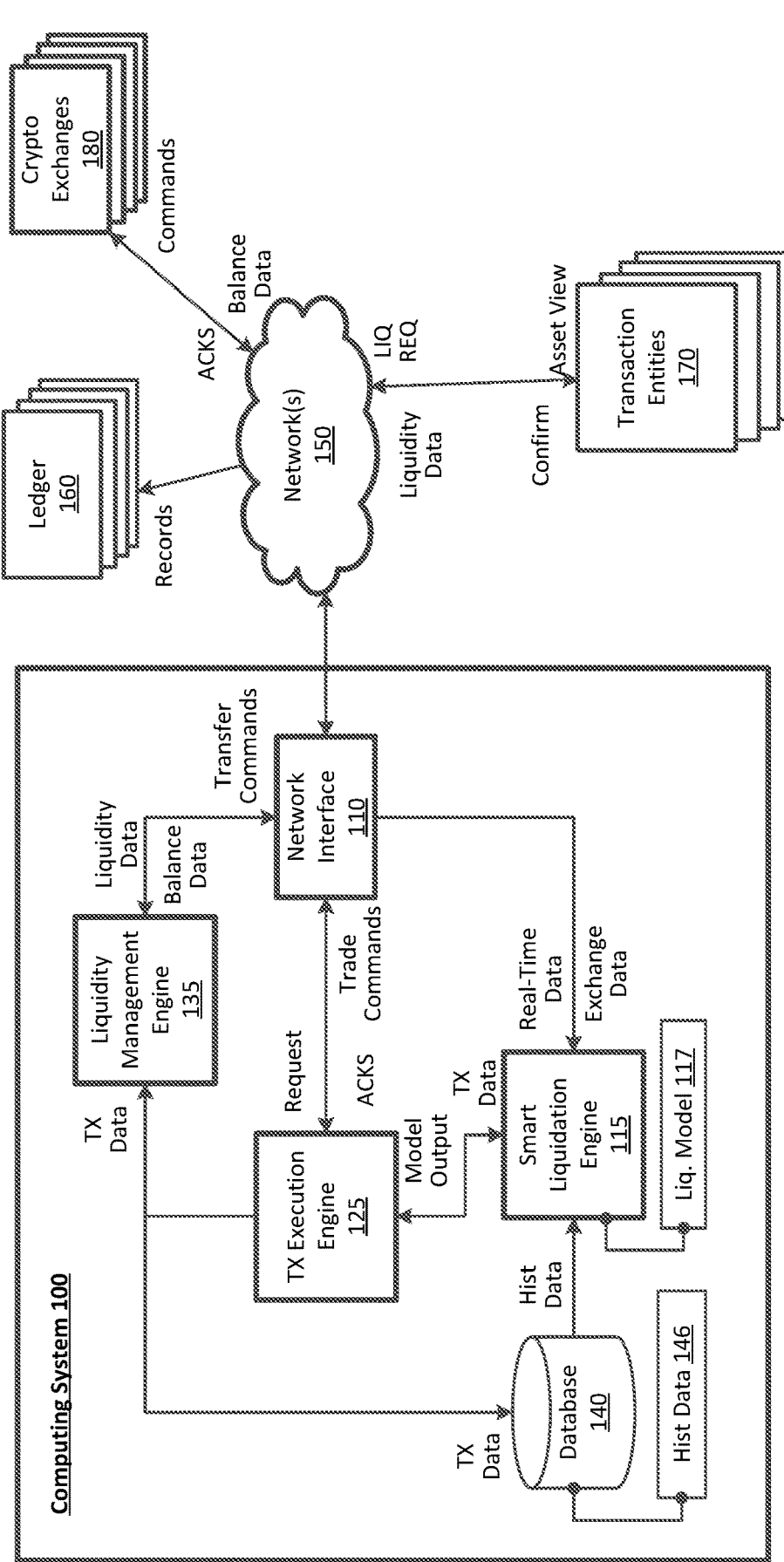
FIG. 1 is a block diagram illustrating a network-based computing system 100 implementing digital wallet management and liquidation strategy techniques, according to examples described herein.

A network-based computing system can implement machine learning techniques using the unique liquidity data from various client computing systems that are involved in transactions using digital assets as a transaction medium. The transaction entity can maintain a digital wallet at one or more crypto exchanges that facilitate transactions between different asset classes, such as the fiat money of a particular national entity and one or more digital currencies. The network-based computing system can provide the transaction entity with a trading platform for automating trade actions, provide liquidity and trade recommendations, and automatically fund (including prefund) the digital wallet of the transaction entity with digital assets based on the unique liquidity data and requirements of the transaction entity.

As provided herein, the unique liquidity data of a transaction entity can include an amount of funds or other convertible assets required for the transaction entity to operate at any given time, such as foreign currencies, cryptocurrencies, commodities, and the like. The transaction entity can comprise any business entity (e.g., multi-national companies and banks) requiring cross-platform or cross-medium conversions for making payouts, such as the conversion from a domestic currency to a foreign currency in order to make payments to a foreign contractor operating in the foreign currency. The computing system described herein can provide a trading platform that facilitates rapid, seamless conversions between these mediums.

One particular technical improvement is the use of an immutable digital ledger or blockchain that enables the rapid transaction from an origin transaction entity in one asset to a receiver entity in any other asset via a pair of digital currency conversions. A primary inefficiency in such transactions is the requirement of a trusted third-party (e.g., a clearing house) that executes a series of authentications between the two transaction entities and a facilitator in a home location of each transaction entity (e.g., a domestic bank and a foreign bank). The clearing house acts as a mediator to ensure that facilitators are notified of the transaction details in order to facilitate the ultimate execution of the transaction, which can take multiple hours or days, which exposes such cross-medium transactions to market volatility. The use of cryptocurrencies to facilitate cross-medium transactions allow for near-instantaneous conversions and recording on a decentralized ledger that significantly reduces or eliminates exposure to volatility while maintaining transaction immutability.

According to examples described herein, the computing system manages a digital wallet of each of a plurality of transaction entities (e.g., exchange bailment wallets) to facilitate rapid and seamless cross-medium transactions for the transaction entity by performing automated digital wallet funding to maintain optimal liquidity for the transaction entity. The computing system manages the liquidity in a particular transaction entity's digital wallet by providing optimized recommendations based on real-time data (e.g., exchange rate data, volatility data, real-time crypto-exchange data, etc.). The computing system further provides the transaction entity with automatic monitoring and alerting based on the real-time data in order to adjust digital wallet amounts to maintain optimal balances. For example, when the exchange rate between a foreign currency and a domestic currency for a transaction entity fluctuates, the computing system can automatically adjust the digital wallet balance of the transaction entity to maintain an optimal balance in accordance with the fluctuations. In further examples, the computing system can provide the transaction entity with real-time alerts when liquidity in the transactions entity's digital wallet falls below the transaction entity's anticipated needs.

In various implementations, the computing system can further make predictions based on real-time and historical data to automatically adjust the digital wallet balance of the transaction entity to maintain or adjust the optimal balance. As provided herein, the digital wallet balance comprises an amount of a digital currency (e.g., a particular cryptocurrency managed by the computing system) in the digital wallet of the transaction entity, which can be held at a particular crypto exchange. The transaction entity utilizes the digital wallet balance to make payments in any convertible asset (e.g., foreign currency) through conversion of the digital currency in the transaction entity's digital wallet and recordation of the conversion and transaction on the digital ledger.

Based on the unique liquidity data of a particular transaction entity, the computing system can establish a low liquidity threshold for the digital wallet of the transaction entity. In various examples, the low liquidity threshold can correspond to a liquidity risk of the transaction entity based on historical consumption patterns of the transaction entity. The computing system can manage the balance of the digital wallet as a safety mechanism so that the transaction entity always has sufficient funds in the digital wallet for day-to-day operations. In doing so, the computing system can receive inputs comprising transaction entity rules and/or modifications that can correspond to the transaction entity's unique liquidity requirements and risk tolerance. In further examples, the computing system can process historical consumption data of the transaction entity combined with the transaction entity rules to make periodically or dynamically updated predictions of the transaction entity's liquidity requirements to establish and update the low liquidity threshold for the transaction entity's digital wallet.

The computing system may further perform automated monitoring and alerting for the transaction entity and provide alerts when the low liquidity threshold is breached. According to examples described herein, the computing system can control a digital wallet at various crypto exchanges to readily perform the digital wallet monitoring and balance adjustment techniques described herein. Based on each client transaction entity's low liquidity threshold and rules and/or liquidity requirements, the computing system can automatically transfer digital currency amounts to and from the digital wallets of the client transaction entities in each crypto exchange. One particular advantage of the optimizations described herein is reduced liquidity risk for client transaction entities while maintaining lower operational balances in their digital wallets, enabling the client transaction entities to deploy additional funds that would otherwise be stored for operational purposes in other manners (e.g., investments).

In various examples, the computing system can further execute a machine learning or artificial intelligence liquidation model based on real-time data to provide payment size and interval recommendations for each client transaction entity. The real-time data can comprise current transaction data from the crypto exchanges which may have limited capacity for transaction executions (e.g., maximum transaction amounts and/or maximum transaction count per given time frame). The real-time data can further comprise market liquidity metrics (e.g., transaction volume, trade count, spreads, exchange prices, etc.). The liquidation model can further ingest historical market volatility data, liquidity metrics, and on-demand liquidity activity to perform the smart liquidation techniques described herein.

According to examples provided herein, the liquidation model can process the aforementioned data to determine clip sizes for execution and transaction intervals in order to minimize risk of liquidation failure. For example, based on the real-time and historical data, the liquidation model can, as a background operation, perform a set of liquidation simulations for each crypto exchange to determine a maximum clip size and minimum transaction interval given a set of current transaction requests from one or more client transaction entities. In further examples, the computing system can perform automated compliance actions by generating records for each digital wallet balance adjustment and transmitting such records to the transaction entities and crypto exchanges where the digital wallets are located.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the disclosure include processors and various forms of memory for holding data and instructions. Examples of non-transitory computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating a network-based computing system 100 for implementing digital wallet management and liquidation strategy techniques, according to examples described herein. In various examples, the computing system 100 can include a network interface 110 to enable the computing system 100 to communicate over one or more networks 150 with the computing systems of crypto exchanges 180 and transaction entities 170.

Each transaction entity 170 can be associated with an account (or entity) identifier that is unique to the transaction entity. Each transaction entity can onboard with the system 100 by execution of onboarding processes where (i) one or more digital wallets are created for and provided to the transaction entity 170 for use with the system 100, and/or (ii) one or more existing digital wallets are identified for subsequent use by the system 100. Accordingly, onboarding processes can provide credentials for a digital wallet that is created for the transaction entity. The transaction entity 170 can also interact with the onboarding processes to provide credentials for one or more digital wallets that are owned, controlled or otherwise associated with the transaction entity. The transaction entity can also provide online credentials for enabling access to accounts of the transaction entity with financial institutions (e.g., online bank accounts, stock brokerage accounts, etc.). The system 100 can also maintain a profile for each transaction entity 170, where the profile associates a unique identifier (e.g., account) of the transaction entity with one or more digital wallets and financial accounts. The profile for each transaction entity 170 can accumulate a variety of information overtime, such as, for example, liquidity preferences and requirements of the user, and historical activity affecting the liquidity of the transaction entity.

In further examples, the network interface 110 includes processes that communicate with one or multiple ledgers 160 (via corresponding ledger interfaces) where digital assets and transactions involving the transfer of digital assets are recorded. In some examples, one or more of the ledgers 160 is integral with the system 100, such that, for example, the system 100 and the ledger 160 are controlled by common entity and/or operated under a common set of governance rules. In variations, one or more of the ledgers 160 is external or not integral with the system 100. The ledger(s) 160 may include ledgers of many types, such as distributed-ledgers, centralized ledgers, block-chain ledgers, and non-block chain ledgers. Depending on implementation, the system 100 can communicate with a ledger interface(s) that operates as a network service, with the corresponding ledger (and copies of it) being provided on servers, work-stations, or personal computers of ledger users.

The computing system 100 can further include a transaction execution engine 125 that can receive transaction requests from the computing systems of the transaction entities 170, and can transmit trade commands to one or more digital asset exchanges 180 (or "crypto-exchanges 180") for execution of transactions involving digital assets. The trade commands that can be executed can include commands for i) exchanging a digital asset for a fiat, (ii) exchanging a fiat for a digital asset, iii) exchanging a first type of digital asset for a second type of digital asset, or iv) exchanging a first fiat for a second fiat. Still further, the transaction execution engine 125 can perform individual trade commands through execution of multiple sub-commands, with the sub-commands being executed at the same time or in series, and/or on one digital asset exchange or on multiple digital asset exchanges.

According to some examples, the computing system 100 includes a liquidity management engine 135 to implement operations relating to the management of liquidity of one or more digital wallets of a transaction entity 170. In examples, the performance of liquidity management can include asset visibility operations, funding transfer operations, liquidity evaluation operations, and liquidity management operations.

To implement visibility operations, the liquidity management engine 135 implements processes to access and combine data from one or more digital wallets of the transaction entity 170. The liquidity management engine 135 can also implement processes to access one or more financial account(s) of individual entities. The digital wallet(s) can individually, or collectively, identify one or more multiple types of digital assets (e.g., one or more types of crypto-currencies, NFTs, tokenized assets, etc.). In some examples, the liquidity management engine 135 can also access financial accounts of the transaction entity, which can identify assets that are maintained with financial institutions and depending on the account, can reflect fiat assets (e.g., government-issued fiat), government issued debt or bonds, stocks, options and various other forms of government-issued or private assets. For individual transaction entities, the liquidity management engine 135 can generate an asset view that identifies the various assets (including digital assets) of the transaction entity in a dashboard or unified presentation. The liquidity management engine 135 can generate and provide each transaction entity with an asset view of one or more types of assets maintained with one or more wallets and/or financial account(s). Further, the asset view can be transparent to specific digital wallets or accounts where an asset represented in the asset view is provided. Additionally, the asset view can be updated dynamically, to reflect updates to balances, as well as liquidity conditions affecting specific assets.

In examples, the system 100 performs funding transfer operations for particular types of transactions. In particular, for exchange of fiat, such as between a source fiat (e.g., USD) and a target fiat (e.g., MXN) (also referred to as a "cross-border payment"), the system 100 can implement a process in which (i) a digital source wallet of a transaction entity 170 is funded with an equivalent amount of digital currency (e.g., XRP), based on an established, market-based transaction price (or exchange rate) for the asset pair of source fiat to digital currency (e.g., USD/XRP); (ii) once the digital wallet is funded, the digital currency (in the equivalent amount of the source fiat that is to be exchanged) is transferred to a digital wallet associated with a recipient institution or entity; (iii) an exchange between the digital currency transferred to the recipient's digital wallet and the target fiat is performed at an exchange rate for the asset pair (XRP/MXN), with the target fiat being deposited in a financial account accessible to a recipient of the fiat exchange; and (iv) the transaction entity that initiated the transfer is subsequently charged (e.g., invoiced) for an amount of the equivalent source fiat intended with the transfer. A process as described can estimate and account for service fees and costs, as well as market fluctuations when, for example, the amount of digital currency for use in funding the source digital wallet is determined (which can be inclusive of costs). In a process described, digital currency is transferred by or under control of a funding process to the digital wallet(s) of a transaction entity, to enable the transaction entity to make the fiat exchange. The liquidity management engine 135 can include processes to enable funding and transfer control for the source digital wallet (and possibly this recipient digital wallet).

In such examples, the frequency and amount of funding transfer operations depends on the activities of the transaction entity 170. The liquidity management engine 135 performs funding operations to enable a transaction entity 170 to make numerous cross-border payments in a given time interval (e.g., a day, week or month). The funding transfers can occur on-demand, such as in response to a request by a transaction entity to make a cross-border payment. Alternatively, the liquidity management engine 135 forecasts transaction activities of the transfer entity 170 where funding of digital currency is to occur (e.g., such as for cross-border payments). The forecasting can be based on historical activities of the transaction entity with respect to the digital wallet and/or one or more financial accounts (e.g., payables account) associated with the digital wallet. The forecasting can identify the number and/or amount (e.g., in terms of source fiat) of cross-border transactions the particular transaction entity will perform, as well as the time when such payments are needed. The forecasting can be based on historical activity of the transaction entity with respect to the digital wallet being funded. Stochastic or predictive machine-learned models can be developed to predict the funding requirements for a transaction entity.

In some examples, the system 100 can maintain a funding digital wallet, where digital currency (e.g., XRP) is stored to fund transfers for cross border payments of one or multiple transaction entities. As an addition or variation, the system

100 can use the funding digital wallet to pre-fund the digital wallet of a transaction entity, based on a forecast of the payment activity (e.g., working capital requirements) of the transaction entity with respect to cross-border payments. However, examples recognize that the value exchange between fiat and digital currency, as well as between digital currency and fiat, can be subject to fluctuations and volatility. Thus, the use of a funding digital wallet, or pre-funding of the transaction entity's funding wallet, raises a risk that digital currency accumulated at one exchange rate loses value when the digital currency is subsequently used to fund a cross-border payment. However, if the time interval between when funding of the digital account occurs and when the transfer of digital currency between source and recipient digital wallets occurs is relatively small, the risk can be lessened. The greater the time interval, the greater the risk of unwanted events, such as a flurry of activity causing market fluctuation or price, as well as activity that causes a delay in the completion time of the transaction. In the latter case, when a flurry of transactions occur with respect to a digital currency, the ledger 160 for that digital currency can experience bottlenecks and delays, with operations on the ledger taking longer.

In some examples, the liquidity management engine 135 forecasts transactions of a transaction entity 170 where funding of the digital currency is required. In some examples, the liquidity management engine 135 forecasts the amount of digital currency that a transaction entity 170 will require in a given time interval (e.g., day, hour, week, etc.), and then prefunds a funding digital wallet of the transaction entity based on the forecast.

In examples, the liquidity management engine 135 monitors the digital wallet of a transaction entity to determine whether the amount of digital currency is, or is forecast to be between a low threshold amount of upper limit. Either condition can represent a sub-optimal allocation or use of resource. When the amount of digital currency is above the upper limit, the value associated with the allocated digital currency is likely to go stale, and funds which may otherwise be used for different purposes or unused. Likewise, as described below, a low liquidity threshold can raise the possibility of bottlenecks in the ledger 160 and/or unwanted market fluctuations with the exchange 180. Such conditions can delay the completion of a transaction, as well as increase the cost to the transaction entity because of transaction cost and/or market volatility.

In such examples, a low liquidity threshold can be detected when the transaction entity 170 is forecast to require additional digital currency to meet, for example, its working capitol requirements for an upcoming time interval, but the amount of digital currency that is pre-funded in the digital wallet for the time interval is not sufficient, and additional digital currency is needed. The liquidity management engine 135 can then signal a transfer account to fund the digital wallet of the transaction entity 170. However, the more the liquidity management engine 135 can forecast in advance a low liquidity occurrence, the better the liquidity management engine 135 can avoid contributing to a bottleneck on the ledger 160 where the digital currency that is used for the transfer is recorded. For example, if a large transaction is needed to add sufficient liquidity to the digital wallet, the existence of the low liquidity condition can result in in the large transaction being executed at a time when the ledger is under heavy use, resulting in lower performance by the processes that maintain the ledger 160. These delays, in combination with market conditions can cause delays to the completion time of transactions, while also contributing to volatility in the market.

In some examples, the liquidity management engine 135 can access raw data associated with the ledger 160 (e.g., distributed block-chain) to determine instances when the ledger is under high demand, and then issue transaction commands on the corresponding exchange 180 and/or transfer commands (e.g., to the ledger 160) to fund the digital wallet of the transaction entity using a funding account managed by the system 100. Based on raw data obtained from the ledger 160, and/or market conditions and data obtained from the exchange 180, the commands issued for funding the digital wallet of the transaction entity 170 can be structured by volume, number and/or timing (e.g., when trade is to be executed), to avoid, or at least mitigate against the occurrence bottlenecks with respect to activity on the ledger 160. As a result, the performance and efficiency of the ledger 160 can be improved, resulting in more predictable transfer completion times and exchange rates/cost, while also protecting against unwanted market conditions where steep price fluctuations arise as a result of sudden demand.

In some examples, the liquidity management engine 135 can group liquidity forecasting and prefunding. The liquidity management engine 135 can identify multiple transaction entities as cohorts for purpose of funding their respective digital wallets with digital currency to enable transactions such as cross-border payments. The identification of transaction entities 170 as cohorts can be based on a variety of characteristics—for example, transaction entities that share a common geographic region (e.g., initiate cross-border payments using a common source fiat) can be viewed as cohorts in given time intervals. Other characteristics include transaction entities 170 that share characteristics with respect to prior transactions (e.g., target fiats used, amount of transactions, time (e.g., during day, week or month) when transactions occur, etc.). The identification of cohorts can be made on discrete time intervals when transaction requests (e.g., fiat transfers) are received by the system 100. Alternatively, the identification of cohorts can be done in advance, based on the presence of shared characteristics amongst the entities that constitute a cohort. The determination of cohorts can also be refreshed periodically, based on activity levels of the transaction entities.

The liquidity management engine 135 can detect, for example, multiple transaction entities 170 initiating (or requesting) cross-border payments within a given time interval (e.g., 5 seconds, 60 seconds, etc.). Through analysis of the initiated transactions, the liquidity management engine 135 can identify one or more cohorts. More generally, transactions with matching characteristics (e.g., source fiat transfer) can be grouped and evaluated for liquidation metrics (e.g., amount of digital currency needed by each transaction entity to complete the transfer). The liquidity management engine 135 can determine a plan to transfer digital currency to the digital wallet of each transaction entity in a manner that is optimal for one or more objectives of the system 100: (i) minimizing the load on the corresponding ledger 160, (ii) minimizing price fluctuations to the digital currency, and/or (iii) increasing transaction completion time. Further, the liquidity management engine 135 can initiate an exchange of the digital currency for the target fiat. In the case of cohorts that are grouped by target fiat, the transaction orders to exchange the digital currency for the target fiat can be staggered to avoid bottlenecks and price fluctuations. Likewise, the transactions can be combined and clipped to maintain steady inflow to the exchange between digital currency and the target fiat, which can further optimize the load on the ledger 160, and minimize unwanted market conditions with the exchange 180. Still further, the price charged by the service 100 can be dynamically determined based on the size of the transactions for an identified cohort.

As an addition or variation, the liquidity management engine 135 can forecast that multiple transaction entities will likely initiate cross-border payments in a given time interval (e.g., 4 hours, 8 hours, etc.). In such case, the liquidity management engine 135 can fund the digital wallets based on forecasts that each transaction entity is expected to make in an upcoming time interval. The forecasts can predict individual transactions, the number of transactions, the amounts indicated with each transactions, and/or the total number of transactions in a given time interval. Based on the forecasts, the liquidity management engine 135 can initiate the cross-border payments on behalf of the identified transaction entities in a manner that minimizes bottlenecks on the ledger and/or reduces the chance of volatility on the crypto-exchange. In examples, the liquidity management engine 135 can operate to minimize bottlenecks on the ledger and/or volatility of the crypto-exchange 180 using raw data obtained from the ledger (e.g., where real-time transaction information can be parsed) and/or market condition information from the crypto-exchange.

Still further, in examples, the timing of when transactions are to be completed for transaction entities 170 can fluctuate over an interval (e.g., seconds, minutes, etc.). The transaction entity 170 can, for example, select the instance over a given time interval for initiating a cross-border payment that is received from a transaction entity. In a first time interval, the liquidity management engine 135 can aggregate transaction orders (e.g., cross-border payments) from one or multiple entities, and then during a second time interval, the liquidity management engine 135 can initiate the transactions (e.g., cross-border payments) in a manner that is optimized, specifically to minimize the load on the ledger 160 and/or volatility. For example, the liquidity management engine 135 can stagger or combine orders based on the real-time raw data obtained from the ledger 160 and/or market conditions provided by an exchange 180. By selecting the time when individual transaction occur, the liquidity management engine 135 can optimize for speed in the completion of the transaction.

The liquidity management engine 135 can implement liquidity evaluation operations by determining liquidity metrics for each transaction entity 170. The liquidity metrics can reflect a current or forecasted availability of an asset of a particular type that matches to a liquidity need, also referenced herein as a "target liquidity asset". In many cases, the target liquidity asset for a transaction entity 170 is a fiat (e.g., USD), which are most typically used to meet liquidity demands for working capital (e.g., daily accounts payable, periodic accounts payable such as payroll, etc.). In the case of a transaction entity 170 that is a business enterprise with an international presence, the liquidity metrics may be determined for multiple different target liquidity asset types, such as multiple fiats (e.g., USD, MXP), to meet liquidity demands which stem from, for example, working capital requirements in multiple countries. Transaction entities 170 can also have liquidity demands for non-fiat assets, such as contractual demand for particular types of digital assets (e.g., XRP, Bitcoin), or internal (entity-specific) rules or preferences for maintaining certain types of assets for investment and/or balance sheet purposes (e.g., periodic contribution of Bitcoin or other digital asset as inflation hedge). Thus, based on preferences/needs of the transaction entity 170, the target liquidity asset type for the transaction entity can include non-fiat assets, such as Bitcoin or other digital assets.

To implement liquidity evaluation operations, the liquidity management engine 135 can receive liquidity data for individual transaction entities 170, where the liquidity data include transactions that are withdrawals and deposits from the digital wallets and financial accounts of the user. The transactions can, for example, be performed as part of the working capital workflow of the transaction entity 170. In such examples, the liquidity data can reflect the working capital requirements of the transaction entity 170, including payment or transaction information of the transaction entity 170 over a given time frame (e.g., cross-border, foreign exchange transactions and trades, commodity conversions or trades, etc.). Accordingly, the liquidity data can be unique to the corresponding transaction entity. The liquidity data can be determined by monitoring, for example, the digital wallet (s) and/or online financial accounts of the transaction entity. As described with examples, the liquidity data can be processed by the liquidity management engine 135 to determine one or more low liquidity thresholds for one or more digital wallets of the transaction entity 170 held at one or more of the crypto exchanges 180.

The liquidity management engine 135 can determine liquidity thresholds which are specific to the particular transaction entity 170. For a given transaction entity, a low liquidity threshold can be based on a current availability of a target liquidity asset that exists with the digital wallets and financial accounts of the transaction entity 170 (e.g., USD cash on hand).

In examples, liquidity data can be in relation to a target liquidity asset, such as a fiat currency. The liquidity data can reflect the amount of target liquidity asset that currently exists with the digital wallet or financial account of the transaction entity 170 (e.g., amount of cash (or USD) distributed in the one or more bank accounts of the user). The target liquidity data can also reflect an amount of other asset types that can be exchanged, or otherwise used to obtain the target liquidity asset type. However, as other types of assets (e.g., crypto-currency) must be exchanged for the target liquidity asset (e.g., USD), such liquidity data can also reflect an expense or cost associated with the other asset, to reflect the cost to the transaction entity 170 for exchanging the asset into the target liquidity asset. As an addition or variation, such other types of assets may also be associated with a time value, such as may be measured in seconds, minutes, hours, days or more, reflecting an expected time for converting the asset into the target liquid asset type. Accordingly, in considering other asset types when determining the availability of a target asset liquidity type, the liquidity management engine 135 can also account for timing and/or cost of converting the other asset type into a target liquidity asset type. Collectively, metrics that account for timing and cost to exchange one asset for the target liquidity asset can represent the relative ease of exchanging one type of asset (e.g., Bitcoin) into the target liquidity asset type (e.g., fiat USD). The liquidity management engine 135 can evaluate many types of assets and asset pairs to determine the ease of liquidity in relation to specific target liquidity asset types. For each transaction entity 170, the different types of assets identified from the wallets/accounts of the transaction entity can be ranked or tiered, based on ease of liquidity. For example, for a transaction entity 170 where the target liquidity asset type is the US Dollar, digital assets such as XRP, BTC or stable coins can be ranked highest, given the relative speed and low cost for exchanging such assets into USD (US Dollar). Conversely, a digital asset such as an uncommon digital currency can be ranked lower because such a digital asset may require more time and cost to exchange for the target liquidity asset.

In performing liquidity evaluation operations, the liquidity management engine 135 can determine liquidity metrics that identify or correlate to liquidity levels for a target liquidity asset type in terms of an actual or forecasted demand on the transaction entity for that type of asset. The liquidity management engine 135 can implement stochastic and/or machine learned models to predict such liquidity demands on individual transaction entities 170, based on historical activities associated with the respective transaction entity's profile. The liquidity management engine 135 can forecast liquidity demands based on, for example, (i) historical analysis of liquidity data, including working capital requirements of the transaction entity 170 and corresponding industry; and (ii) events that have historically correlated to an increase or decrease in liquidity demands (e.g., increase in interest rates, activities in particular markets, etc.) on the transaction entity and/or the target liquid asset type of the transaction entity 170.

By way of example, the liquidity management engine 135 can determine, using stochastic and/or predictive models, one or more liquidity metrics that are based at least in part on (i) the amount of target liquidity asset that the transaction entity has, (ii) a forecast of the amount of target liquidity asset that the transaction entity will have in an upcoming time interval (e.g., where the upcoming time interval is over X minutes or hours, during a particular time interval the following day or week, etc.); (iii) a current demand on the transaction entity for the target liquidity asset (e.g., from the working capital requirements of the transaction entity 170), and (iv) a forecast of the demand on the transaction entity 170 for the target liquidity asset over an upcoming time interval (e.g., where the upcoming time interval is over X seconds, minutes or hours, during a particular time interval the following day or week, etc.).

In some implementations, the liquidity management engine 135 can define low liquidity thresholds for different asset types of individual transaction entities 170. For example, a low liquidity threshold can be based on a score that compares the amount of target liquidity asset that is currently available or forecast to be available to the transaction entity at a given time relative to a current and/or forecasted demand on the transaction entity 170 for that asset type. In such an example, if the score is, for example, greater than or equal to one, representing positive or neutral liquidity over an upcoming time interval, then no liquidity threshold may be met. If on the other hand, the score is less than one, the liquidity management engine 135 can signal a liquidity threshold or condition as being presently met, or forecast to be met when liquidity further depletes. As an addition or variation, the low liquidity threshold can be represented in the form of a time interval remaining until no amount, or an insufficient amount, of target liquidity asset remains with the digital wallet(s) and/or accounts of the transaction entity 135.

Still further, the low liquidity threshold can be predetermined from historical liquidity data, as well as current and/or forecasted liquidity demand on the particular transaction entity for the target liquidity type.

In examples, the liquidity management engine 135 can implement liquidity evaluation operations for individual transaction entities 170, where the liquidity evaluation operations include detecting whether a low liquidity threshold condition has been met with respect to the existing or forecasted supply of a target liquidity asset of the target entity 170. Thus, in examples, the low liquidity threshold can be detected for a current time interval and/or forecast for an upcoming time interval. The determination of whether the low liquidity threshold has been met for an upcoming time interval can take into account current amounts of a corresponding target liquidity asset, a forecast of target liquidity asset which may be received by the transaction entity (e.g., receipt of account receivables, through expected or planned exchanges of other types of assets, etc.), as well as the current and/or forecasted demand on the transaction entity for a corresponding target liquidity asset.

As an illustrative example, the transaction entity 170 may possess a digital wallet at a crypto exchange 180 that converts a particular cryptocurrency (e.g., XRP) to and from a particular fiat currency (e.g., Mexican pesos). The transaction entity 170 may require a certain amount of liquidity in the cryptocurrency for on-demand payments in Mexican pesos. In this example, the liquidity management engine 135 can process payment and liquidity data of the transaction entity 170 utilizing the digital wallet at this crypto exchange to determine a low liquidity threshold of the transaction entity's digital wallet at the crypto exchange, as well as a target liquidity amount for the digital wallet (e.g., a three-day liquidity requirement for the transaction entity 170). In some examples, the client transaction entity 170 can establish a number of days of liquidity required in the digital wallet, and the liquidity management engine 135 can monitor and adjust the balance of the transaction entity's digital wallet based on the target number of days of required liquidity.

Accordingly, in some examples, the liquidity management engine 135 represents the liquidity of a transaction entity 170 in terms of a time interval (e.g., number of days). The time interval can be specified by the transaction entity 170, or automatically determined automatically based on historical liquidity data of the transaction entity 170. The liquidity management engine 135 can set a low liquidity threshold (e.g., equal to one day of liquidity needs for the transaction entity 170) and an upper target liquidity threshold for the digital wallet (e.g., equal to three days of liquidity needs). The liquidity management engine 135 can perform continuous monitoring of the balances of the digital wallet (s) and financial accounts of the transaction entity 170 to detect when a lower liquidity threshold is met.

In examples, the lower liquidity threshold can be determined specific to particular types of assets (e.g., digital currencies, particular digital currency, fiat, etc.), including the target liquidity asset. As an addition or variation, the lower liquidity threshold can be determined for particular categories of assets—such as fiats and digital assets that are easiest (or ranked highest in terms of timing and/or cost) to exchange for fiat. The liquidity management engine 135 can monitor for multiple types of liquidity thresholds, to maintain the balance with particular types of assets within a liquidity tranche between these thresholds.

In examples, the liquidity management engine 135 can perform liquidity management operations to protect or mitigate against low liquidity conditions. The liquidity management operations can include actions that indirectly or directly improve the low liquidity condition detected with the monitored digital wallet(s) and/or financial accounts of the transaction entity 170. The detection of low liquidity thresholds, as well as management operations to remediate forecasted or actual low liquidity operations, can be performed specific to an account or digital wallet, as well as specific to a target liquidity asset (e.g., a fiat in the geographic region of the transaction entity).

In some examples, when a low liquidity condition is detected with respect to the monitored digital wallet(s) and accounts of the transaction entity 170, the liquidity management engine 135 can transmits an alert (e.g., message, notification, telephonic communication) to a contact identifier associated the transaction entity 170. The alert can inform the transaction entity 170 of the low liquidity condition, such as providing an estimate of the number of days, hours or minutes of liquidity that remain. The liquidity management engine 135 can also identify one or more actions (or recommended actions) that can be taken to directly improve the low liquidity condition. For example, the liquidity management engine 135 can identify one or more digital assets in a monitored digital wallet of the transaction entity 170 which is ranked highly in terms of ease of liquidity with respect to the target liquidity asset. As described with some examples, in the case of funding a digital wallet with digital currency for transactions such as cross-border payments, the detection of low liquidity thresholds can result in mitigation action where the liquidity management engine 135 funds the account with additional digital currency. The determination of when to fund the funding wallet can consider factors such as the upper threshold for the funding wallet and the time interval when the digital currency is likely to be used (based on forecasted liquidity conditions).

In variations, the liquidity management engine 135 can automatically identify and implement liquidity management actions, such as to exchange digital assets to target fiat currency based on liquidity ease of the digital asset or asset pair. The determination of the action to perform can be based on the availability of the alternative digital assets, as well as historical liquidity data (e.g., frequent exchanges of a particular digital asset into a desired target asset). As an addition or variation, the liquidity management engine 135 can implement liquidity management operations to automatically transfer digital currency from a funding wallet—owned and/or controlled by the computing system 100 at the crypto exchange—to a digital wallet of the transaction entity 170 to rebalance the digital wallet of the transaction entity 170 to a target liquidity amount or within the liquidity tranche unique to the transaction entity 170. As a result, the transaction entity 170 may be provided with a guarantee of sufficient liquidity for the transaction entity's operations (e.g., working capital payments), thereby reducing or eliminating liquidity risk while also reducing the capital requirements of the transaction entity 170. Further description of the functions of the liquidity management engine 135 is provide below with respect to an example method of FIG. 3. Additionally, the liquidity management actions where liquidity is automatically obtained can be implemented in part using processes described with the smart liquidation engine 115.

In various implementations, the computing system 100 can include a smart liquidation engine 115 that can execute a trained machine learning or artificial intelligence liquidity model 117 to process exchange data from the crypto exchanges (e.g., indicating liquidation amount and execution interval limitations) and real-time market and volatility data to automatically organize or otherwise break up liquidation requests for execution into smaller clips to minimize or eliminate liquidation failure risk and ensure successful liquidation for transaction entities 170. In previous implementations, the transaction entity 170 was forced to estimate and/or manually break up large liquidations based on, for example, limitations at the crypto exchange. With the inclusion of the smart liquidation engine 115 executing one or multiple liquidation model(s) 117, the computing system 100 can optimize and automate the parsing of payment and liquidation amounts using real-time data from the crypto exchange(s) at which the payments and liquidations take place. In some examples, the smart liquidation engine 115 uses a library of models. By way of illustration, the smart liquidation engine 115 can utilize models 117 that are predictive of outcomes, as well as models that implement optimization for particular objectives (e.g., minimizing transaction completion time and/or cost). Specific examples include stochastic models, regression models, and graph traversal models.

The liquidation model(s) 117 can utilize, as input signals, real-time data from multiple sources, including market data, liquidity constraints as published by crypto exchanges, as well raw transaction-related data which can be read or otherwise accessed from ledgers that are used with digital assets of crypto exchanges. The smart liquidation engine 115 can implement the model(s) to generate model outputs to the transaction execution engine 125. The model outputs can include parameters that identify how liquidity requests (e.g., trade of digital asset for USD are to be broken, including the size (e.g., number of tokens being exchanged) and number of clips for the request, as well as the timing when individual clips are to be exchanged.

In examples, the size and number of clips, as well as the timing of when clips are to be exchanged can be optimized to reduce transaction cost (e.g., exchange rate, transaction cost, etc.) and/or minimize risk related to delayed completion of the transaction (e.g., extreme fluctuation price, delayed availability of liquidity, etc.). Further, the optimization of when clips are to be transacted on the exchange 180 can be optimized to reduce the load on the ledger 160, as well as to avoid market imbalance with the corresponding ledger 160. The optimization determination for the transaction can minimize the total for a transaction to complete. In examples, the smart liquidity engine 135 can repeatedly read or otherwise obtain real-time transaction information from the ledger 160 of an exchange, for purpose of determining the demand or load (e.g., number of open transactions, performance of the ledger) on the ledger 160. Based in the determination, the smart liquidation engine 115 can initiate the transaction requiring use of the ledger 160. Further, the smart liquidation engine 115 can optimize the clip size and number to optimize the completion time of the total transaction. For example, the smart liquidation engine 115 can utilize real-time and historical raw data (corresponding to transaction information), including time stamps and lot size of transactions, to determine an optimal clip size for quickest processing and verification on the ledger 160. Based on the determination of an optimal lot size, the smart liquidation engine 115 can segment a transaction order into a number of clips of optimal size, and submit the clips in parallel in order to reduce or minimize the completion time for the transaction.

Further, the particular venue for completing some or all of the transaction can also be selected to minimize cost and risk. For example, the smart liquidation engine 115 can scan and/or obtain real-time raw data from multiple ledgers where a particular type of asset pair are exchanged (e.g., XRP to MXN). The selection of venue can be based on a determination of the particular exchange that is supported by the ledger 160 with the fastest transaction times. Further, in some examples, optimal clip sizes may be determined for each of multiple ledgers 160, and transaction completion times for the optimal clip size on each exchange can be used to segment a transaction into parallel orders, each order being executed on a different exchange 180 that is supported by one of the ledgers 160. In this way, multiple exchanges 180 can be used to optimize for transaction completion time, while reducing load to one specific ledger 160.

In examples such as described with cross-border payments, the transaction execution engine 125 can process transaction requests from the transaction entities 170 based on volatility data from the crypto exchanges 180 to provide the transaction entities 170 with a guaranteed exchange rate for a particular liquidation request (e.g., a guaranteed exchange rate for a conversion from a digital currency to a fiat currency). The provision of a guaranteed exchange rate is possible based on the near-instantaneous execution of the conversion at the exchange and recordation of the transaction on a corresponding ledger 160. However, when liquidation or conversion amounts are large, crypto exchanges may not have the capacity to execute them in a single batch or the market conditions on the particular exchange can pose a risk to exchange rate, transaction cost or transaction completion time. Further, an exchange order (particularly larger exchange orders) can sometimes experience relatively significant price fluctuation and/or transaction cost, such as when, for example, the order is executed in times of high volume, low supply, high demand or high volatility. The occurrence of significant price fluctuations and/or high transaction costs can affect the accuracy of the predicted exchange rate for an asset pair. In examples when the transaction engine 125 guarantees an exchange rate between an asset pair, the transaction engine 125 can provide or require slippage balancing to compensate for the fluctuation/transaction price, so that the transaction is executed at the guaranteed exchange rate.

According to examples described herein, the smart liquidation engine 115, through execution of the liquidation model 117, can monitor historical data 146 (e.g., compiled in a local database 140 or third-party databases) and real-time constraints at the individual crypto exchanges—such as order book depth, current or recent market liquidity and volatility metrics, hard thresholds of the individual crypto exchanges (e.g., total volume limits, interval limits, etc.), fiat currency liquidation amount constraints, etc.—and generate a set of transaction or liquidation parameters for a current transaction request from a transaction entity 170. The smart liquidation engine 115 can also use real-time raw data (transaction information) from ledgers 160 to train models 117, and to generate the set of transaction or liquidation parameters for current transaction requests. The transaction request can indicate a total amount of crypto and/or fiat currency to be liquidated, converted, or otherwise paid or transferred to a receiving entity. As an example, a transaction entity 170 may wish to transfer an amount of cryptocurrency from a digital wallet at a particular crypto exchange to the digital wallet of a recipient at a second crypto exchange. Based on the historical and real time constraints of each of the crypto exchanges 180, the smart liquidation engine 115 can parse the transaction amount into optimized clips to be transferred at optimal intervals such that the probability of transaction failure is minimized or eliminated.

In various examples, the liquidity management engine 135 and smart liquidation engine 115 can operate in conjunction with a transaction execution engine 125 that processes transaction and/or liquidation requests from the transaction entities 170 and transmits trade commands to the crypto exchanges 180 based on the details of the transaction and/or liquidation requests. In doing so, the transaction execution engine 125 can provide the details of a particular transaction request to the smart liquidation engine 115. The details can comprise a transaction amount, a recipient identifier (e.g., a digital wallet identifier), identifiers for a sending and receiving crypto exchange 180, sending and receiving transaction mediums (e.g., fiat currencies), and the like. The liquidation model 117 can receive the transaction details from the transaction execution engine 125 and parse the transaction amount into transaction clips with smaller amounts and transaction intervals based on the real-time data and the historical data 146 of the particular crypto exchange(s) 180 at which the transaction is to be executed in order to minimize the risk of transaction failure.

The smart liquidation engine 115 can output an execution plan for a transaction request, where the execution plan indicates the optimized clip sizes, number, and intervals for the transaction to the transaction execution engine 125. The transaction execution engine 125 may then generate a set of trade commands for the transaction based on the execution plan outputted by the smart liquidation engine 115 and transmit the trade commands to the relevant crypto exchange(s) 180 for execution. In certain examples, the crypto exchange(s) 180 executing the transaction can transmit acknowledgments and/or confirmations when the transaction commands have been received and executed. Further, the trade commands can be programmatically implemented, such that the trade commands are implemented automatically.

The smart liquidation engine 115 can also identify the venue (e.g., which crypto-exchange 180) that should be used to exchange individual clips. The smart liquidation engine 115 can access published exchanged information (e.g., volume, volatility, and other metrics specific to a particular asset or category of assets, etc.) provided by or for each of multiple accessible crypto-exchanges 180, as well as transaction data associated with the underlying ledgers for each of the underlying crypto-exchanges 180. Additionally, the smart liquidation engine 115 can access historical exchange information associated with each crypto-exchange 180, where the historical information indicates, at various times, volume, volatility, and other metrics specific to a particular asset or category of assets. Based on the current and historical exchange information, the smart liquidation engine 115 can select to conduct an exchange for a given asset pair using one or multiple venues, in a manner that optimizes an objective such as liquidity or transaction cost and transaction execution time. Accordingly, in examples, the smart liquidation engine 115 can identify a more desirable venue (e.g., a crypto exchange 180 having better exchange rates and/or that is capable of larger transactions at smaller intervals). In such examples, the smart liquidation engine 115 can provide an alert to the transaction entity 170 indicating the more desirable venue, or can automatically output this information to the transaction execution engine 125, which can generate and transmit trade commands to the more desirable crypto exchange 180 accordingly. In further examples, depending on the location and balances of the digital wallets and financial accounts of the transaction entities 170, the smart liquidation engine 115 can make automated venue selections for the transactions corresponding to the transaction requests from the transaction entities 170. Accordingly, based on the transaction amounts indicated in the requests, the smart liquidation engine 115 utilize the real-time exchange data (e.g., indicating current volatility and order depths at individual crypto exchanges 180) to select an optimal crypto exchange 180 for executing the transaction.

Additionally, in some examples, the smart liquidation engine 115 can determine an optimal transaction path for completing a desired exchange of a transaction entity 170 between a first asset and a second asset. In such examples, the smart liquidation engine 115 can determine a transaction path that includes one or more intermediate transactions, resulting in a multi-step transaction. The selection of a multi-step transaction, in lieu of a direct exchange between the source/target asset pairs, can be selected to advance an objective for the transaction, such as an objective to minimize the completion time of the transaction (as between source/target), an objective to minimize a volatility or risk of the transaction, and/or an objective to reduce an overall cost of a desired transaction. The smart liquidation engine 115 can access a database of historical transactions for asset pairs, where transaction metrics such as transaction time, transaction cost, market volatility (e.g., difference between the bid and ask) and outcomes can be evaluated. The transaction metrics for the direct exchange of a asset pair can be compared to transaction metrics of alternative asset pair transactions which when conducted in series are equivalent to the desired direct exchange. For example, a user may wish to exchange Bitcoin for a relatively little used crypto-currency. While the crypto-exchange 180 may offer the asset pair as a direct transaction, the smart liquidation engine 115 can determine that two transactions consisting of Bitcoin/Ethereum, and Ethereum to the target crypto-currency have better timing, risk and cost metrics. In such case, the smart liquidation engine 115 can generate a recommendation that identifies the optimal transaction path. Alternatively, the smart liquidation engine 115 can automatically perform the transactions for the optimal path on one or multiple crypto-exchanges.

Accordingly, in examples, the smart liquidation engine can generate execution plans, which can be programmatically implemented, to automate trades in an optimized manner. The optimization of trades can further an objective speedier completion times for the transaction and less market volatility. The optimizations can directly or indirectly result in more efficient (and speedier) execution of processing resources used by the corresponding ledger 160. In some examples, the execution plan for a given trade can also take into account venue (or exchange) selection (e.g., to further completion time or reduce load on ledger 16), and a transaction path that is more optimal than a direct transaction between asset pairs of a transaction request. The execution plan can be generated on request by a user of a transaction entity. Alternatively, the execution plan can be generated in response to a determination that a low liquidation threshold has been met.

In some examples, the transaction data corresponding to the transaction can be received as input by the liquidity management engine 135, which can continue monitoring the wallet balance of the digital wallet of the transaction entity 170 instigating the transaction. If the wallet balance drops below the low liquidity threshold, the liquidity management engine 135 can transmit a low liquidity alert to the transaction entity 170 and/or transmit a transfer command to the crypto exchange 180 at which the digital wallet is located to adjust the wallet balance such that it is within the optimal liquidity tranche of the transaction entity 170. As provided herein, the transfer command can comprise transfer instructions for the crypto exchange 180 to transfer a certain amount of digital currency from a digital wallet owned by the computing system 100 to the digital wallet of the transaction entity 170.

In accordance with examples described herein, the transaction entities 170 utilizing the liquidity management engine 135 and smart liquidation engine 115 of the computing system 100 can be provided with automated digital wallet adjustment and liquidation and transaction execution planning such that liquidation and transaction failure risks are minimized or eliminated, liquidity risk is minimized or eliminated, and the working capital requirement (e.g., reserve amounts needed for every day operations) is reduced. Further description of the functions of the liquidity management engine 135 and smart liquidation engine 115 is provided below with respect to the flow charts of FIGS. 2 and 3.

Methodology

Figure 2:
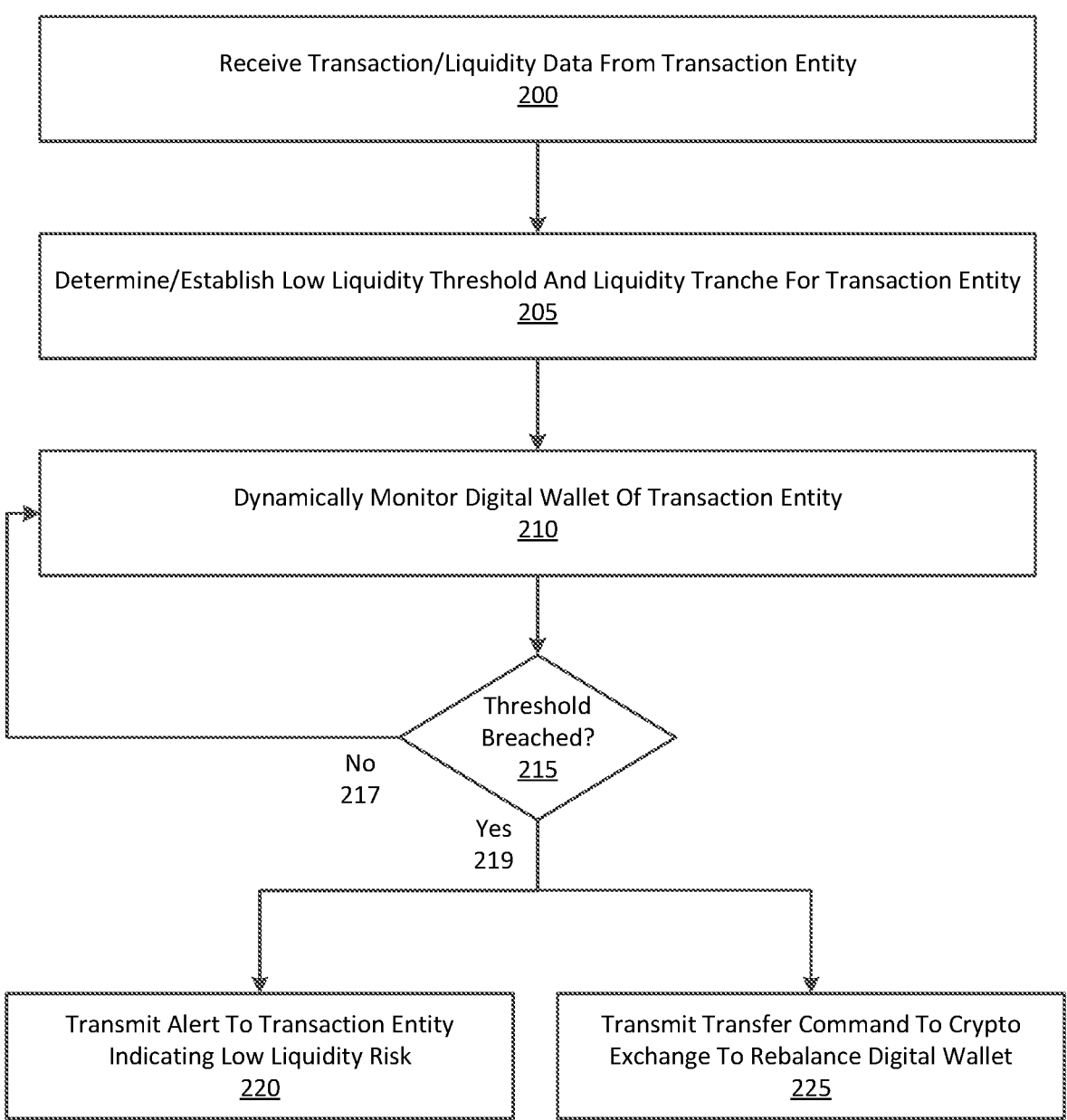
FIG. 2 is flow chart describing a method of digital wallet management for client transaction entities, according to various examples.

FIG. 2 illustrates a method for managing financial resources of transaction entities against low liquidity events and conditions, according to one or more examples. FIG. 3 illustrates a method for managing liquidation of an asset on an exchange to minimize failure risks, according to one or more embodiments. In describing an example of FIG. 2 and FIG. 3, reference may be made to elements of FIG. 1 for purpose of illustrating suitable components and functionality for perform a step or sub-step being described. Referring to FIG. 2, the digital liquidity management engine 135 of the computing system 100 can receive liquidity data for a transaction entity 170 (200). As provided herein, the liquidity data can be specific or unique to the transaction entity 170. The liquidity data can indicate, for example, the operational capital requirements of the transaction entity 170 over the course of a particular time period (e.g., three days). In certain examples, the transaction entity 170 can provide the liquidity management engine 135 with a desired time period for working capital based on, for example, a risk tolerance of the transaction entity 170. The liquidity data can identify the operating expenses of the transaction entity 170 utilizing a digital wallet at a particular crypto exchange 180, or multiple digital wallets across multiple crypto exchanges 180.

In various implementations, the liquidity management engine 135 can determine and establish a low liquidity threshold and a liquidity tranche for the digital wallet of the transaction entity based on the indicated risk tolerance and/or liquidity demands on the transaction entity (205). The liquidity demands can correspond to, for example, withdrawals (e.g., for accounts payables) from the monitored digital wallet(s) and/or financial accounts of the user. In certain examples, the low liquidity threshold can correspond to a time interval for the operational expenses of the transaction entity 170 (e.g., equal to one day of liquidity needs or other time interval selected by the transaction entity 170). Furthermore, the liquidity tranche can correspond to an optimized upper bound for the digital wallet, such that the digital wallet balance typically fluctuates within the liquidity tranche between the upper bound and the low liquidity threshold.

In variations, the low liquidity threshold and/or liquidity tranche are dynamically determined values, based on real-time liquidity of the transaction entity, trending behaviors of the transaction entity (e.g., transaction entity becomes more risk-adverse), raw data relating to transactions of digital assets on corresponding ledgers 160, and/or market conditions and volatility (e.g., financial market crash or other event that causes high volatility). Additionally, in variations, the liquidity management engine 135 can implement liquidity models to predict current liquidity thresholds of the transaction entity. As an addition or variation, the liquidity management engine 135 can also use liquidity models to forecast the liquidity thresholds for the transaction entity at a future time interval. Example liquidity models can utilize signals that include entity-specific information, including historical liquidity data, as well as market information (e.g., market volatility, industry-specific liquidity thresholds, etc.).

According to examples described herein, the liquidity management engine 135 can dynamically monitor the digital wallet(s) of the transaction entity 170 (210). As the transaction entity 170 operates and makes payments, transactions, trades, etc., the balance of the digital wallet fluctuates. The liquidity management engine 135 can implement processes to protect against an event where the wallet balance does not breach the low liquidity threshold. Further, the liquidity management engine can implement processes to mitigate or rectify situations where the low liquidity threshold is breached. For example, the liquidity management engine 135 can be triggered to perform one more liquidity management actions.

Accordingly, the liquidity management engine 135 can continuously determined whether the low liquidity threshold of a digital wallet has been breached (215). If not (217), then the liquidity management engine 135 can continue monitoring the digital wallet of the transaction entity 170 (210). However, if the low liquidity threshold is breached (219), the liquidity management engine 135 can transmit an alert to the transaction entity 170 indicating low liquidity risk for the digital wallet (220). Thereafter, the transaction entity 170 may manually increase the balance of the digital wallet. Alternatively, when the low liquidity threshold is breached (219), the liquidity management engine 135 can automatically transmit a transfer command (e.g., for funding a digital wallet with digital currency from a funding wallet) or trade command to execute an exchange on the crypto exchange 180. In the case where a digital currency is to fund a cross-border payment, for example, the transfer a particular amount of digital currency can be between a digital wallet of the computing system 100 and the digital wallet of the transaction entity 170. Such a transaction can be recorded and verified on a corresponding ledger 160 of the digital currency. The balance of the digital wallet for the transaction entity 170 can be adjusted to be within the liquidity tranche (225).

It is contemplated that the automated rebalancing function provided by the liquidity management engine 135 can comprise a loan or advance of digital currency to the transaction entity 170. The transaction entity 170 may hold the advanced amount in the digital wallet until the advancement is utilized (e.g., for a payment or other transaction). At the point of utilization, the transaction entity 170 can be provided with a payment request from the computing system 100 at a current or guaranteed exchange rate to cover the advanced funds.

In some examples, the liquidity management engine 135 can implement actions to mitigate or rectify low liquidity conditions using multiple thresholds. The liquidity management engine 135 can determine multiple threshold levels for low liquidity, with each threshold level being associated with a severity level and a set of mitigation/remediation actions. For example, the liquidity management engine 135 can determine multiple low liquidity thresholds, such as (i) a first liquidity threshold level where the liquidity management engine 135 takes a first type of action (e.g., send a message, perform monitoring more frequently, implement a more conservative trading profile for trading digital assets, etc.), (ii) a second liquidity threshold level where the liquidity management engine 135 takes a second type of action (e.g., signal a warning or send a notification), and/or (iii) a third liquidity threshold level where the liquidity management engine 135 where takes action to mitigate or rectify a low liquidity condition (e.g., perform a trade, or a series of trades). In such an example, the low liquidity threshold can be determined as described, with warning or mitigation thresholds set based on a predefined variation or value (e.g., liquidity warning threshold 10% above low liquidity threshold, etc.).

As an addition or variation, the monitoring can be predictive. The liquidity management engine 135 can, for example, predict a likely liquidity threshold and/or tranche for a future time interval (e.g., the next hour, day or week) for individual transaction entities using predictive models that incorporate entity-specific data (e.g., historical analysis of entities' liquidity thresholds or needs) and market data (e.g., market volatility, industry-specific liquidity trends, etc.). In such examples, the liquidity management engine 135 can also take action to reduce the chances of the low liquidity threshold being breached for a particular transaction entity. The type of action which liquidity management engine 135 can implement can be based on, for example, a likelihood (e.g., probability score) that the liquidity threshold will be breached unless intervention occurs, and/or (ii) the proximity in time until the low liquidity threshold is breached. The liquidity management engine 135 can anticipate such events and perform actions such as to fund the digital wallet of the transaction manager or initiate trade executions to mitigate risk. Further, the actions performed can be intelligently selected to advance an objective, such as reducing anticipated cost or mitigating risk to the transaction entity.

With reference to FIG. 3, an example method as described enables use of machine-learned liquidation models to minimize or prevent the occurrence of failure risk. A failure risk can refer to a transaction which fails to execute, or fails to execute in accordance with expected or predefined transaction parameters, such as transaction price (e.g., unfavorable price fluctuation due to volatility), transaction fee (e.g., service fee charged by online exchange 18 due to high volume or traffic) or transaction completion time. In various examples, the smart liquidation engine 115 of the computing system 100 can execute machine learned (or artificial intelligence) liquidation model(s) 117 that are predictive of a fluctuation level of a digital asset that is or is to be traded in an exchange. For example, in the case of an exchange where the transaction entity is or will be trading fiat for digital asset (such as Bitcoin or other cryptocurrency), implementation of the model(s) 117 may be predictive of the price fluctuation with respect to the digital asset being acquired (e.g., predictive of the amount of fiat needed to acquire a designated amount of digital asset). As another example, in the case of an exchange where the transaction entity is or will be trading a digital asset for a fiat, the implementation of the model(s) 117 may be predictive of the price fluctuation for the asset being used to acquire the fiat (e.g., predictive of the amount of digital asset needed to acquire a designated amount of fiat). Still further, in variations, the model(s) 117 can be predictive of price fluctuation with respect to each type of asset in an asset exchange. For example, in the case where the transaction is or will be exchanging a first type of asset for a second type of asset, implementation of model(s) 117 can predict price variations for either type of asset. Further, the predicted price variations can be as between the specific digital assets of the exchange, or as between each asset of the exchange and a corresponding fiat or intermediary asset, such that the predicted price variations or with respect to a reference asset that is not part of the transaction.

With respect to examples such as described above, implementation of the model(s) can result in one or multiple types of outputs, such as, for example, (i) a predicted value or value change of one or more assets that are to be exchanged, (ii) a predicted range of values or value changes for one or more assets that are to be exchanged, (iii) a probability score or indication of a predicted value or value change, (iv) a risk score that is indicative of the likelihood of an unwanted change in value for one or more of the assets that are to be exchanged, and/or (v) a risk score that quantifies a potential severity of an unwanted change in value of one or more of the assets that are to be exchanged, where the probability of the potential severity occurring exceeds some threshold (e.g., 25%). Still further, the model(s) 117 can be predictive of general market conditions or failures which can result because of a particular exchange (e.g., digital asset for fiat or vice-versa), such as the occurrence of low liquidity conditions for the market and/or the occurrence of high volatility conditions in the market in general or for the particular asset.

The liquidation model(s) can be trained using historical transaction information and/or market data obtained from, for example, one or multiple crypto exchanges 180. The historical data can be specific to a particular crypto exchange and/or to a particular digital asset. For a particular type of digital asset, the historical transaction information can, identify, for example, identify transactions for a particular crypto exchange 180 or for multiple crypto exchanges. Further, the historical information can reflect the size of the transaction, the value of the digital asset relative to one or multiple types of assets (e.g., particular fiat, another type of digital asset, etc.), time of day and day of week, market conditions at the time of the transaction (e.g., market volatility), market depth for the particular type of asset, and other parametric information. As an addition or variation, the model(s) can be trained on conditions or transaction parameters where a transaction or market failure occurred. For example, the model(s) 117 can identify transactions on particular crypto exchanges where the transaction caused an unwanted price fluctuation (to the detriment of a trading entity) or raised an unwanted risk level (e.g., time interval to complete transaction on exchange took longer than threshold time). From such historical data, the model(s) can include a failure model that is predictive of trade parameters (e.g., transaction size, price, etc.) and/or market conditions (e.g., market volatility) where the drop in value (or risk thereof) of an acquired asset is too high, less than the mean, or not optimal.

Still further, in some examples, the liquidation models 117 can be trained using raw data obtained from ledger(s) 160 used with the exchanges. The raw data can include time-stamped data identifying, for example, offers for a particular digital asset, transaction settlement prices, volume/quantity of the transaction, transaction cost and resources (e.g., "gas fee), time of execution and other information.

As described with some examples, the model(s) 117 can be predictive of unwanted events (e.g., unwanted price fluctuations) for particular exchanges, based on, for example, the volume and/or total value of the assets that are to be traded (e.g., number of coins and/or overall value of coins in fiat, etc.). As an addition or variation, the model(s) 117 can identify an optimal size or volume (or thereof) for an asset that is to be exchanged, where the optimal size/volume is based on an objective of, for example, maintaining the overall value of an acquired asset (e.g., digital asset or fiat) after a desired exchange is completed. Still further, the model(s) can be predictive of the effect of timing or timing parameters with respect to when trades are executed. For example, for a desired exchange, the model(s) 117 can predict a time during a 24-hour period when the exchange, if initiated as a single transaction with, for example, crypto exchange 180 is least/most likely to cause an undesirable fluctuation in the value of the asset being acquired. As an addition or variation, the model(s) 117 can determine a risk score, representing a likelihood and/or amount of risk, with specific time intervals for executing an individual transaction on the crypto exchange 180. As an addition or variation, the model(s) 117 can indicate a risk level or score for a time interval between successive transactions, where the successive transactions are to collectively complete a desired transaction. Still further, as another addition or variation, the model(s) 117 can select an optimal time interval between such successive transactions. The smart liquidation engine 115 can operate to overcome these limitations by optimizing transactions for execution at the crypto exchanges 180 in a manner that minimizes or eliminates transaction failure risk due to the constraints of the crypto exchanges 180.

Referring to FIG. 3, the smart liquidation engine 115 can receive transaction data corresponding to a transaction request from a transaction entity 170 (300). On a high level, the smart liquidation engine 115 executes one or more liquidation models 117 (e.g., a machine learned model), and based on an output of the executed model(s) 117, generates an execution plan for the transaction request, The generated execution plan can be based on input signals that include, for example, market conditions, (e.g., volume of trades, volatility, price movements, supply and demand volume, etc.) as well as the size and current value of the asset of the exchange (305). For example, the smart liquidation engine 115 can determine the execution plan based on real-time obtained from the crypto exchange data 180 and/or ledger 160 where transactions are recorded. Such real-time data can indicate current order depth (e.g., a number of queued transactions with indicated transaction amounts), volatility, failure data (e.g., indicating current transaction failures at the crypto exchange 180 and their details), and the like (307). Market conditions and exchange data can be determined from a variety of sources, including from information published by the exchange sources, and/or from raw data recorded with the ledgers of the crypto exchanges 180. In further examples, the smart liquidation engine 115 can determine the execution plan based on historical transaction failure data from the crypto exchange(s) 180, which can be determinative of the specific transaction constraints of the crypto exchange(s) 180 (309).

As provided herein, the transaction constraints can comprise, at any given time, maximum transaction amounts and transaction intervals for the crypto exchange 180 at which the risk of transaction failure is minimized or non-existent. In generating the execution plan for the transaction, the smart liquidation engine 115 can parse or segment the transaction request into individual clips (e.g., multiple smaller transactions) and executing timing intervals for the clips to minimize and/or eliminate transaction failure risk (310). The execution of the model(s) 117 can identify, for example, (i) a size of each clip (which may vary from clip to clip), and (ii) a time interval between when transactions for individual clips are completed. As an addition or variation, execution of the model(s) 117 can identify alternative crypto exchanges to complete transactions for one or more of the clips, or alternatively, an alternative exchange for performing the transaction request in one or more transactions.

As provided herein, the execution plan may also be based on real-time constraints of the crypto exchange 180, as determined by the smart liquidation engine 115 based on the real-time data described above.

In examples, the smart liquidation engine 115 generates an execution plan as programmatic instructions that are autonomously implemented using processes represented by the transaction execution engine 125. Accordingly, the smart liquidation engine 115 may then output the execution plan to the transaction execution engine 125 of the computing system 100, which can generate trade commands in accordance with the individual clips and timing intervals of the execution plan. The transaction execution engine 125 can then transmit the trade commands to the relevant crypto exchange(s) 180 for execution accordingly.

Client Computing Device

Figure 4:
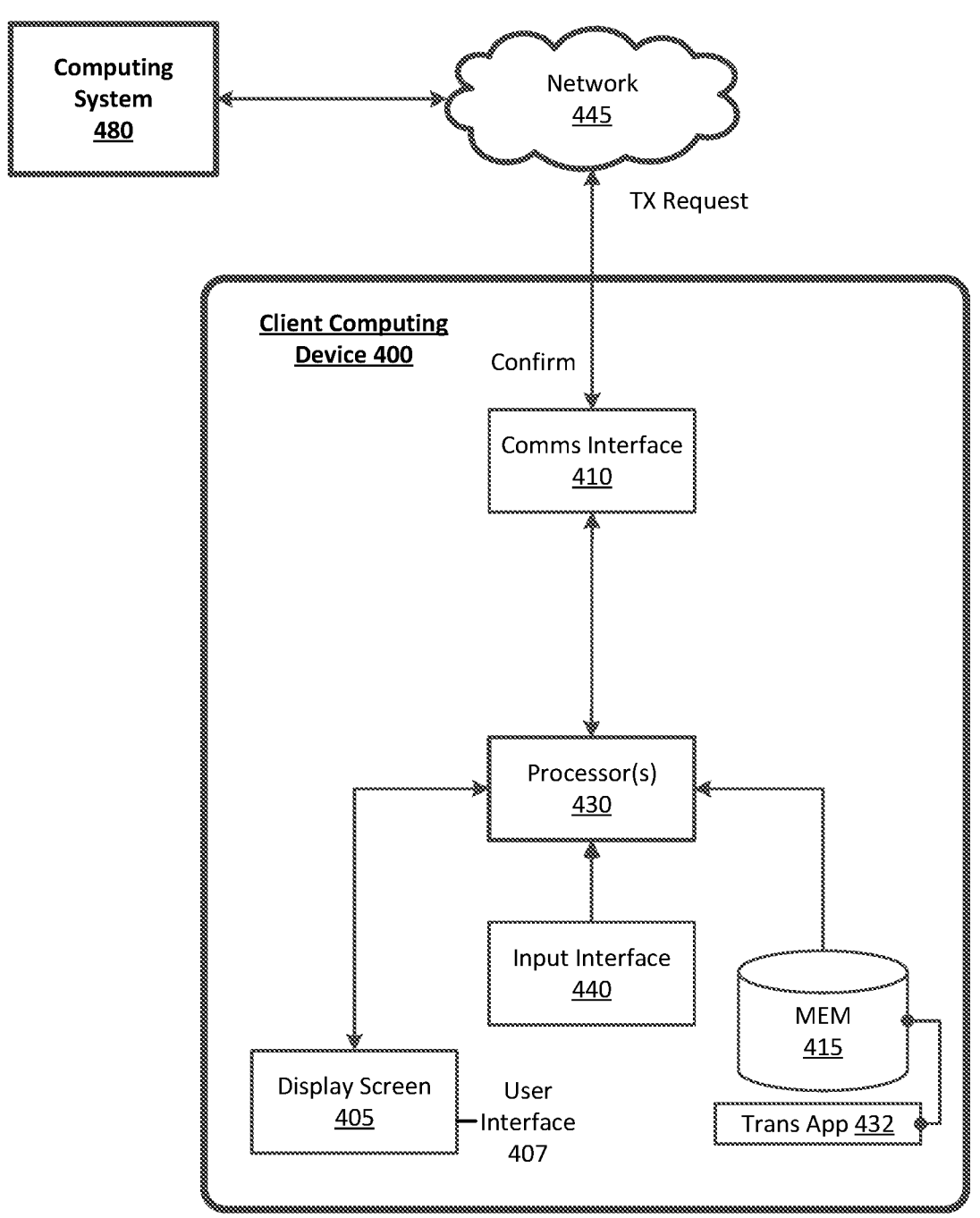
FIG. 4 is a block diagram illustrating a client computing device of a client transaction entity for triggering transaction and/or liquidation requests, according to examples described herein.

FIG. 4 is client computing device executing a transaction application for initiating transaction services, according to various examples. In many implementations, the computing device 400 can comprise a mobile computing device, such as a personal computer, smartphone, tablet computer, laptop computer, and the like. In variations, the computing device 200 can comprise a desktop personal computer typical of the office spaces of business entities, or a computer server of a backend server network typical of financial institutions. In some examples, the computing device 400 can include certain features such as a microphone, a camera, a positioning system, and a sensor system (e.g., IMU), such as those included in mobile computing devices. Additionally, the computing device 400 can include a communication interface 410 to communicate with external entities using any type of wireless or wired communication protocol. In certain aspects, the computing device 400 can store a designated application (e.g., a transaction service application 432) in a local memory 415 to enable a sending or receiving client to engage with the computing system 480 executing the wallet management and smart liquidation services described in connection with FIG. 1.

In response to a user input (e.g., via one or more input interfaces 440, such as a keyboard, mouse, etc.) selecting the transaction service application 432, the application 432 can be executed by one or more processors 430, which can cause a user interface 407 to be generated on a display screen 405 of the computing device 400. Furthermore, the executing application can enable the computing device 400 to communicate with the computing system 480 over one or more networks 445. As provided herein, the computing system 480 shown in FIG. 4 can correspond to the network computing system 100 of FIG. 1.

The user interface 407 of the transaction service application 432 can enable the client to configure and transmit transaction requests to transfer an amount of a value medium to a receiving client. For example, a user of a transaction entity can launch the transaction application 432, which can generate a user interface 407 on the display screen 405. Through user input, the user can generate a transaction request indicating a transaction amount to be transferred to a receiving client. As stated herein, the transaction request can further indicate a first transaction medium (e.g., a home currency of the transaction entity) and a recipient transaction medium (e.g., a home currency of the recipient). In certain implementations, the computing system 480 can provide the user with a guaranteed exchange rate between the value mediums.

As described, the user interface 407 may enable the user to input an amount of a value medium (e.g., a specified cryptocurrency, fiat currency, or other digital asset) to be transferred. Alternatively, the user can initiate a wallet-to-wallet transfer of a digital currency at a particular exchange. Once the transaction request is configured by the user, the use can transmit the transaction request to the computing system 480 over the one or more networks 445.

The computing system 480 can process the transaction request in the manner described with respect to FIGS. 1-3. Specifically, the computing system 480 can execute smart liquidation to determine a set of constraints of the crypto exchanges that are to execute the transaction, generate an execution plan comprising a set of clips and execution timing intervals for the transaction request, and transmit a set of trade commands to the crypto exchange(s) in accordance with the execution plan to facilitate the transaction.

In various examples, the computing system 480 can provide confirmations to the computing device 400 when, for example, the transaction request is received, when the trade commands are transmitted to the crypto exchanges 180, when the transaction is initiated, and/or when the transaction is completed. On the receiving client side, the transaction computing system 480 can provide a notification that the selected amount by the sending client has been successfully transferred upon receiving a corresponding transaction acknowledgement from the relevant crypto exchange 180.

In further implementations, the computing system 480 can execute digital wallet management for the transaction entities by establishing a low liquidity threshold for each digital wallet and a liquidity tranche that corresponds to the required liquidity of the transaction entity over a determined period of time (e.g., multiple days). When the balance of the digital wallet breaches the low liquidity threshold, the computing system 480 can perform a set of automatic actions, which can include transmitting a low liquidity alert to the computing device 400, or perform automated rebalancing by transferring a top up amount of the digital currency from a digital wallet possessed by the computing system 480 at the crypto exchange to the digital wallet of the transaction entity.

Hardware Diagram

Figure 5:
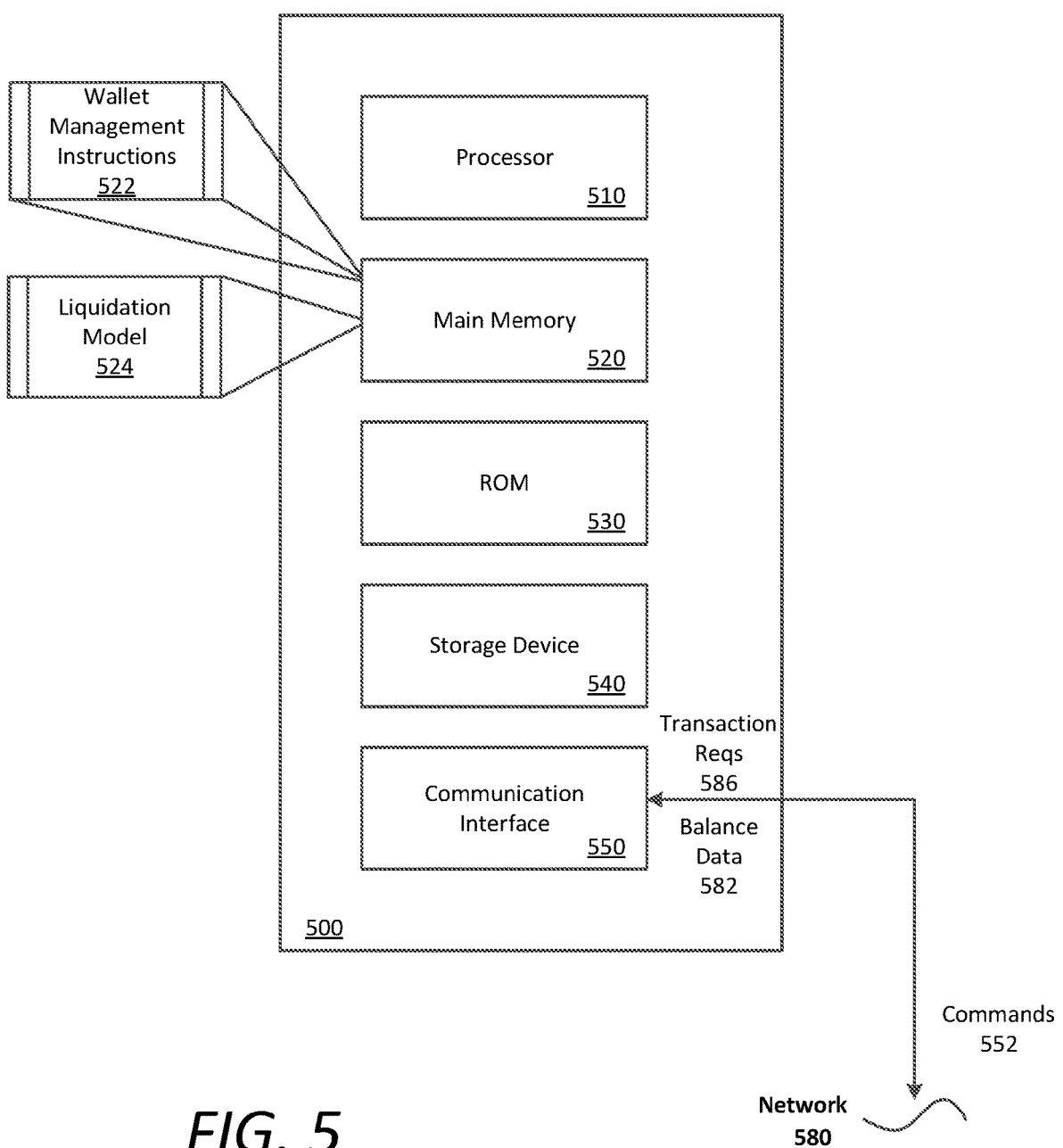
FIG. 5 is a hardware diagram illustrating a computer system upon which examples described herein may be implemented.

FIG. 5 is a hardware diagram illustrating a computer system upon which examples described herein may be implemented. A computer system 500 can be implemented on, for example, a server or combination of servers. For example, the computer system 500 may be implemented as part of a network service for providing transaction services. In the context of FIG. 1, the computing system 100 may be implemented using one or more computer systems 500 such as described by FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate over one or more networks 580

(e.g., cellular or Wi-Fi network) through use of the network link (wireless or wired). Using the network link, the computer system 500 can communicate with one or more computing devices, one or more servers, and/or client transaction terminals. The executable instructions in the memory 520 can include wallet management instructions 522, which the computer system 500 can execute to establish low liquidity thresholds and monitor balance data 582 from client digital wallets at crypto exchanges, as described herein.

The executable instructions stored in memory 520 can also include a liquidation model 524, which the computer system 500 can execute to receive transaction requests 586 from sending clients, generate execution plans for the transaction requests 586 based on real-time exchange data, transmit transaction commands 552 to relevant crypto exchanges, and record transaction records on a distributed interledger, as provided herein.

The processor 510 is configured with software and/or other logic to perform one or more processes, steps and other functions described with implementations, such as described with respect to FIGS. 1-4, and elsewhere in the present application. Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A network-based computing system implementing a transaction execution service, comprising:
   a network communication interface to communicate, over one or more networks with computing devices of transaction entities and computing systems of multiple crypto exchanges;
   one or more processors; and
   a memory storing instructions that, when executed by the one or more processors, cause the network-based computing system to:

receive, over the one or more networks, real-time exchange data from a computing system of a crypto exchange of the multiple crypto exchanges;

based on the real-time exchange data, determine a set of constraints of the crypto exchange;

in response to a low liquidity threshold being triggered for a digital wallet of a transaction entity at the crypto exchange, the low liquidity threshold being determined based on historical consumption patterns of the transaction entity and other liquidity signals to avert liquidity risk, generate an execution plan for the transaction entity in which a first asset is to be exchanged for a second asset using the crypto exchange, wherein generating the execution plan includes:

determining, based on one or more machine learning or artificial intelligence models that utilize the real-time exchange data and the set of constraints as input signals, a set of parameters for transacting a transaction amount as a plurality of clips, the set of parameters being determined to optimize one or more objectives for transacting the transaction amount, the one or more objectives including an objective to reduce a load on a ledger of the crypto exchange where the plurality of clips are to be exchanged;

wherein the optimized set of configuration parameters indicate each of a number of the plurality of clips, a size of each of the plurality of clips, and a timing or input signal for determining when each of the plurality of clips are to be executed on the crypto exchange; and responsive to transmission of a set of transaction commands from the computing system to the crypto exchange, executing the plurality of clips in accordance with the execution plan.

2. The network-based computing system of claim 1, wherein the real-time exchange data comprises an order depth at the crypto exchange.

3. The network-based computing system of claim 2, wherein the order depth corresponds to a current number of transaction requests and transaction amounts for a current number of transaction requests at the crypto exchange.

4. The network-based computing system of claim 1, wherein the execution plan is further optimized for completing one or more transactions of a transaction request while minimizing a transaction cost or risk.

5. The network-based computing system of claim 1, wherein generating the execution plan includes identifying one or more intermediate assets and transactions when exchanging the first asset for the second asset.

6. The network-based computing system of claim 5, wherein generating the execution plan includes identifying multiple sets of transactions that include the intermediate assets.

7. The network-based computing system of claim 1, wherein the execution plan is generated in response to a transaction request.

8. A non-transitory computer-readable medium that stores instructions, which when executed by one or more processors of a computer system, cause the computer system to perform operations that comprise:

receiving, over the one or more networks, real-time exchange data from a computing system of a crypto exchange;

based on the real-time exchange data, determining a set of constraints of the crypto exchange;

in response to a low liquidity threshold being triggered for a digital wallet of a transaction entity at the crypto exchange, the low liquidity threshold being determined based on historical consumption patterns of the transaction entity and other liquidity signals to avert liquidity risk, generating an execution plan for the transaction entity in which a first asset is to be exchanged for a second asset using the crypto exchange, wherein generating the execution plan includes:

determining, based on one or more machine learning or artificial intelligence models that utilize the real-time exchange data and the set of constraints as input signals, a set of parameters for transacting a transaction amount as a plurality of clips, the set of parameters being determined to optimize one or more objectives for transacting the transaction amount, the one or more objectives including an objective to reduce a load on a ledger of the crypto exchange where the plurality of clips are to be exchanged;

wherein the optimized set of configuration parameters indicate each of a number of the plurality of clips, a size of each of the plurality of clips, and a timing or input signal for determining when each of the plurality of clips are to be executed on the crypto exchange; and transmitting, over the one or more networks, a set of transaction commands to the respective computing systems of the crypto exchange, to execute the plurality of clips in accordance with the execution plan.

9. The non-transitory computer-readable medium of claim 8, wherein the real-time exchange data comprises an order depth at the crypto exchange.

10. The non-transitory computer-readable medium of claim 9, wherein the order depth corresponds to a current number of transaction requests and transaction amounts for a current number of transaction requests at the crypto exchange.

11. The non-transitory computer-readable medium of claim 8, wherein the set of constraints corresponds to a maximum transaction amount for each clip at the crypto exchange, and a timing interval or parameter for each clip at the crypto exchange.

12. The non-transitory computer-readable medium of claim 8, wherein generating the execution plan includes identifying one or more intermediate assets and transactions when exchanging the first asset for the second asset.

13. The non-transitory computer-readable medium of claim 12, wherein generating the execution plan includes identifying multiple sets of transactions that include the intermediate assets.

14. The non-transitory computer-readable medium of claim 8, wherein the execution plan is generated in response to a transaction request.

15. A computer-implemented method comprising:

receiving, over the one or more networks, real-time exchange data from a computing system of a crypto exchange;

based on the real-time exchange data, determining a set of constraints of the crypto exchange;

in response to a low liquidity threshold being triggered for a digital wallet of a transaction entity at the crypto exchange, the low liquidity threshold being determined based on historical consumption patterns of the transaction entity and other liquidity signals to avert liquidity risk, generating an execution plan for the transaction entity in which a first asset is to be exchanged for a second asset using the crypto exchange, wherein generating the execution plan includes:

identifying a transaction amount for the transaction entity to exchange the first asset for the second asset based on historical consumption patterns of the transaction entity to automatically avert a liquidity risk of the transaction entity;

determining, based on one or more machine learning or artificial intelligence models that utilize the real-time exchange data and the set of constraints as input signals, a set of parameters for transacting a transaction amount as a plurality of clips, the set of parameters being determined to optimize one or more objectives for transacting the transaction amount, the one or more objectives including an objective to reduce a load on a ledger of the crypto exchange where the plurality of clips are to be exchanged;

wherein the optimized set of configuration parameters indicate each of a number of the plurality of clips, a size of each of the plurality of clips, and a timing or input signal for determining when each of the plurality of clips are to be executed on the exchange; and transmitting, over the one or more networks, a set of transaction commands to the respective computing system of the crypto exchange, to execute the plurality of clips in accordance with the execution plan.

16. The method of claim 15, wherein the real-time exchange data comprises an order depth at the crypto exchange.

\* \* \* \* \*